United States Patent Office 2,894,943
Patented July 14, 1959

2,894,943
ERYTHROMYCIN RECOVERY PROCESS

Harrison A. Nelson, Charles M. Large, Malcolm E. Bergy, and Herman Hoeksema, Kalamazoo, Mich., assignors to The Upjohn Company, Kalamazoo, Mich., a corporation of Michigan No Drawing. Application August 16, 1954
Serial No. 450,228

12 Claims. (Cl. 260—210)

This invention relates to a new process and is particularly directed to the isolation of erythromycin from its fermentation beer by a multiple extraction procedure.

It has been known heretofore, see U.S. Patent No. 2,653,899, that erythromycin can be recovered from its fermentation beer by extraction with suitable solvents. Thus in accordance with the preferred process set forth in the above patent, the filtered culture broth (fermentation beer) is made alkaline to about pH 9 to pH 10, preferably about pH 9.5, and then extracted with amyl acetate or like water-immiscible solvent. The erythromycin which exists as the free base at this pH is thus extracted into the amyl acetate. The amyl acetate extract is then extracted with water adjusted to below pH 6.5, preferably to about pH 5, by the addition of sulfuric acid whereby the erythromycin base is transferred from the amyl acetate to erythromycin salt in the aqueous extract. The aqueous extract is then reduced in volume by evaporation and made alkaline to precipitate erythromycin base which is recovered by filtration or centrifugation and purified by recrystallization.

The prior art process has the disadvantage, however, that the aqueous acid extraction cannot conveniently be carried out in a high speed countercurrent extractor. Because of the instability of erythromycin at low pH, it is necessary to add the sulfuric acid gradually as required to keep the pH at about 5 or more. This is not a practical procedure in high speed countercurrent extractions. A further disadvantage, which results from the long contact time of the batchwise extraction required in the prior art process, is that operation of the process on the low side of the permissible pH range tends to promote decomposition of erythromycin. Thus at pH 5 the rate of decomposition of erythromycin may become high enough to result in a substantial loss.

It has now been found that substantial advantage is obtained over the prior art procedures by extracting the amyl acetate extract, or like solvent extract, with an aqueous acid solution buffered at about pH 5 to about pH 6.5. By this expedient, the aqueous acid extraction can be carried out in a continuous high speed countercurrent extractor, such as a Podbielniak extractor, and at the low side of the permissible range of pH, whereas in the prior art process, such continuous high speed countercurrent extraction is not feasible.

It has been found particularly that this advantageous result is accomplished by extracting the amyl acetate extract, or like solvent extract, with an aqueous solution of a weak acid and a strong base adjusted to give a pH between about 5 and about 6.5 and in sufficient volume relative to the quantity of erythromycin to be extracted that the pH of the aqueous solution does not materially change throughout the extraction.

It has been found still further that the advantages of extraction with a buffered aqueous acid solution are most fully realized when the weak acid is a polybasic acid having one pKa between about 5 and about 6.5 and another pKa separated therefrom by not more than two pKa units. With a polybasic acid thus characterized, a pH of between about 5 and about 6.5 is maintained over a wide neutralization range. Hence by this expedient erythromycin can be extracted from the amyl acetate extract, or like solvent extract, with a minimum of aqueous acid solution, a feature particularly desired for continuous high speed counter-current extraction.

It has been found that citric acid, which has one pKa value of 4.74 (pKa²) and another of 5.45 (pKa³), is a most effective acid for use in the process of the invention. When neutralized with sodium hydroxide, or like strong base, to the desired pH range of between about pH 5 and about pH 6.5, there is obtained a buffered acidic solution which is capable of absorbing large quantities of erythromycin free base without substantial change in the pH of the solution.

Other polybasic acids which can be substituted for citric acid are given in the following table:

| Acid | pKa¹ | pKa² |
|---|---|---|
| Succinic | 4.19 | 5.57. |
| Camphoric | 4.57 | 5.10. |
| Itaconic | 3.84 | 5.55. |
| Malic | 3.40 | 5.05. |
| Adipic | 4.4 | 5.44. |
| Azelaic | 4.55 | 5.4. |
| Dimethyl malonic | 3.08 | 5.8. |
| Glutaric | 4.34 | 5.22. |
| β-Methylglutaric | 4.25 | 6.23. |
| Suberic | 4.52 | 5.32. |
| Pimelic | 4.41 | 5.33. |
| Tricarballylic | 4.57 (pKa²) | 5.89 (pKa³). |
| o-(trans) Hexahydrophthalic | 4.18 | 5.92. |
| m-(cis) Hexahydrophthalic | 4.10 | 5.46. |
| m-(trans) Hexahydrophthalic | 4.31 | 5.74. |
| p-(trans) Hexahydrophthalic | 4.44 | 5.80. |
| p-(cis) Hexahydrophthalic | 4.18 | 5.42. |
| cis-Cyclobutan-1,2-dioic | 3.90 | 5.89. |
| trans-Cyclobutan-1,2-dioic | 3.80 | 5.60. |
| trans-Bicycloheptane-1,2-dicarboxylic | 4.07 | 5.66. |
| trans-Δ⁴-bicycloheptane-1,2-dicarboxylic | 4.06 | 5.74. |

In place of citric acid and like polybasic acids having one pKa value in the range of about 5 to about 6.5 and another within two pKa units thereof, there can be used effectively those mono- and poly-basic acids which have a pKa with the desired range of about 5 to about 6.5. Suitable examples of such acids are phthalic acid, picolinic acid, pyromucic acid, trimethyl acetic acid, β,β-dimethyl acrylic acid, glycerophosphoric acid, malonic acid, and the like. Still other acids which can be used, though requiring larger volumes of extracting solution include: acetic acid, propionic acid, n-butyric acid, n-heptoic acid, caproic acid, caprylic acid, hexahydrobenzoic acid, valeric acid, phosphoric acid, n-pelargonic acid, nicotinic acid, isonicotinic acid, and the like. Also salts of weak bases and strong acids, especially where the weak base has a pKa of between about 5 and 6.5, can be used. Examples of suitable weak bases are paparavine, phenylhydrazine, piperazine, pyridine, p-phenetidine, and the like.

It has been found further that additional advantages are obtained over the prior art process by extracting the aqueous acid extract with an inert water-immiscible solvent, advantageously methylene chloride, while concurrently neutralizing the aqueous phase sufficiently to liberate erythromycin free base, suitably from about pH 8.5 to about pH 10.5 and advantageously at about pH 9.5, and recovering the erythromycin from this solvent extract solution either by crystallizing erythromycin free base therefrom or a derivative thereof formed in situ in the solvent extract solution. Thus the erythromycin can be converted to a salt by addition of an acid, e.g., sulfuric acid or hydrochloric acid, or to an ester by the addition of an acid anhydride, e.g., succinic or glutaric anhydride. By thus extracting the aqueous acid extract with a water-immiscible solvent, the erythromycin is recovered more easily and in higher purity than in the prior art process.

It has been found still further that the disadvantages of the prior art are most effectively avoided by a combination of extracting erythromycin free base from its fermentation beer with a water-immiscible solvent, extracting the resulting solution with an acid solution, preferably one buffered at about pH 5 to about pH 6, as more particularly set forth above, and extracting the resulting aqueous solution of erythromycin salt with another water-immiscible solvent while concurrently neutralizing the aqueous solution to liberate erythromycin free base, and recovering erythromycin from the resulting solution.

The first water-immiscible solvent is selected primarily on a basis of its ability to extract erythromycin free base from a dilute aqueous solution. For this purpose amyl acetate has been found advantageous. Other like water-immiscible polar solvents can be used such including alkyl esters of fatty acids, for example, ethyl acetate and butyl acetate; chlorinated hydrocarbons, for example, chloroform and ethylene dichloride; alcohols having slight water-solubility, for example, butanol and amyl alcohol; ketones of slight water-solubility, for example, methyl amyl ketone; and ethers, for example, ethyl ether, and dibutyl ether. The second water-immiscible solvent may be selected on the same basis. Ordinarily it should be a different solvent from the first so that benefit can be had of a change of solvents. Where the erythromycin is to be recovered as erythromycin free base, it is additionally desirable that it have a relatively high temperature coefficient of solubility in order that effective crystallization of erythromycin free base can be obtained on cooling the solution. Methylene chloride has been found especially advantageous in this respect. However, other of the water-immiscible solvents noted above can be used, especially the chlorinated lower aliphatic hydrocarbons.

It has now been found further that certain other disadvantages of the prior art can be avoided by heating the whole beer at a pH of between about 6.5 and about 8 prior to filtering. Advantageously the whole beer is heated to the temperature of 120 to 195 degrees Fahrenheit, advantageously about 140 degrees Fahrenheit for twenty minutes or so. It is then cooled to between about 100 degrees Fahrenheit and the ambient temperature, advantageously to about 86 degrees Fahrenheit, whereupon, with the aid of a suitable filter aid such as diatomaceous earth, the mycelium is filtered off. Heating of the whole beer, followed by cooling and filtering in the process of the invention improves the filtration and results in better recovery of erythromycin as compared with the process of the prior art wherein the whole beer is neutralized and made alkaline to about pH 9.5 and then filtered.

In accordance with the invention, optimum conditions for the recovery of erythromycin with the greatest ease and economy are obtained by heating the whole beer to a temperature of about 120 to 195 degrees Fahrenheit; cooling to a temperature between about 100 degrees Fahrenheit and the ambient temperature; filtering the cooled beer with the aid of a filter aid; adjusting the pH of the clarified beer to liberate erythromycin free base, e.g., to about pH 9 to 10.5; extracting the resulting alkaline solution with a water-immiscible solvent for erythromycin, preferably amyl acetate; extracting the water-immiscible solvent extract with an aqueous acid solution buffered between about pH 5 and about 6.5, preferably with an aqueous acid solution of a dibasic acid having one pKa value between about 5 and about 6.5 and another within two pKa units thereof; then extracting the aqueous extract with another water-immiscible solvent having a relatively high coefficient of temperature solubility, preferably methylene chloride, by agitating a mixture of the aqueous extract with the other water-immiscible solvent while adjusting the pH sufficiently to liberate the erythromycin base in the aqueous phase so that it is extracted into the nonaqueous phase; and crystallizing erythromycin from the water-immiscible solvent extract thus obtained.

The invention may now be more fully understood by referring to the following examples which are illustrative of the process of the invention but are not to be construed as limiting. The parts are by weight unless otherwise specified.

Example 1

Fifteen hundred gallons of whole beer containing approximately 2120 grams of erythromycin by bioassay was adjusted to pH 7.0 with sulfuric acid, heated to 84 degrees centigrade for twenty minutes, cooled to thirty degrees centigrade and filtered with filter aid. The filtered beer, containing 1929 grams of erythromycin by bioassay, was adjusted to pH 10 with 25 percent sodium hydroxide solution in 400-gallon batches and run in the Podbielniak extractor against ⅕ volume of amyl acetate. The amyl acetate extract, 318 gallons, was extracted in the Podbielniak extractor with ¼ volume of 0.2 M $KH_2PO_4$ buffer solution at pH 5.0 to 5.2. The rich buffer solution, eighty gallons, was filtered through a filter aid pad. Bioassay at this point indicated a total of 1240 grams of erythromycin.

The rich buffer solution was extracted with ¹⁄₁₀ volume of methylene chloride twice at pH 9.5, adjusting the pH with 25 percent sodium hydroxide solution. From the methylene chloride extracts was obtained 1159 grams of crystal at a purity of 95% (as determined by optical rotation). This is a 52 percent yield of the activity assayed in the unfiltered beer.

Example 2

The contents of a 5000-gallon fermentation was heated to 140 degrees Fahrenheit for twenty minutes and cooled to 86 degrees Fahrenheit. There was then added approximately 2000 pounds of filter aid and the whole beer then filtered and polished. There was obtained 3740 gallons of clear beer assaying 6.25 kilograms of erythromycin. The clear beer was then extracted with amyl acetate in a Podbielniak extractor at a ratio of approximately five volumes beer to one volume of amyl acetate. A solution of sodium hydroxide obtained by dissolving 400 pounds of flaked sodium hydroxide in 200 gallons of water was injected into the influent beer as required to maintain a pH of the spent beer of 10.2 to 10.4. The rich amyl acetate assayed about 6.25 kilograms of erythromycin. The rich amyl acetate, 747 gallons, after clarification, was extracted in a Podbielniak continuous high-speed countercurrent extractor with a 0.15 M citrate buffer solution prepared by dissolving 179 pounds of sodium citrate dihydrate (U.S.P.) and 26.6 pounds of anhydrous citric acid (U.S.P) in 600 gallons of water to give a solution having a pH of 5.5.

The rich buffer solution, after clarification, was mixed with 13 gallons of methylene chloride in a 1200-gallon tank. This amount of methylene chloride was calculated on the basis of the erythromycin assay of the rich buffer solution to give final methylene chloride solution containing eighty to 100 milligrams of erythromycin per mil. While agitating this mixture, about twenty percent by volume of a 0.6 M sodium carbonate solution, obtained by dissolving 62 pounds of technical sodium carbonate monohydrate in 100 gallons of water, was run in to adjust the pH to 8.5 to 9.5 while maintaining a temperature between 24 and 28 degrees centigrade. From the methylene chloride extract thus obtained there was recovered 4.21 kilograms of erythromycin crystals having a purity of 96.0 percent determined by bioassay. This is a 53.9 percent yield of the activity assayed in the unfiltered beer. This product is specification grade and needs no recrystallization.

The mother liquor and washings from several lots were treated with twenty grams per liter of decolorizing carbon, Darco G-60. From the decolorized salvage fractions there was obtained an average of 0.44 kilogram of specification grade erythromycin per lot. There was thus obtained a total of 31.79 kilograms of specification grade erythromycin which is a 7.0 percent recovery of the activity assayed in the unfiltered beer thus making a total recovery of 60.9 percent of the activity of the unfiltered beer.

It is to be noted that in the prior art process a typical procedure (see Example 1, U.S. Patent 2,653,899) gives a yield of crude erythromycin of 256 grams from about 1100 gallons of unfiltered beer assaying 150 micrograms per mil. This is less than forty percent recovery of the activity assayed in the unfiltered beer, depending upon the purity of the erythromycin recovered. It is to be noted also that to obtain specification grade erythromycin therefrom requires "several recrystallizations from aqueous acetone (2:1 mixture)." If the crude were 95 percent pure, which is doubtful in view of the fact that two recrystallizations are specified for the further purification of it, the recovery is only 38 percent of the activity assayed in the filtered beer.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the recovery of erythromycin from a solution of erythromycin free base in a water-immiscible solvent which comprises extracting said solution with an aqueous solution of a saturated polycarboxylic acid having at least four carbon atoms, said solution having a pH between about 5 and about 6.5.

2. A process for the recovery of erythromycin from a solution of erythromycin free base in a water-immiscible solvent which comprises extracting said solution with an aqueous solution of citric acid and sodium hydroxide in proportions to give a pH of about 5 to about 6.5.

3. A process for the recovery of erythromycin from dilute aqueous solutions thereof which comprises extracting said dilute aqueous solution with a water-immiscible solvent while maintaining the pH between about 9 and about 10.5, extracting the solvent extract thus obtained with an aqueous acid solution maintained at a pH between about 5 and about 6.5, mixing the resulting aqueous extract with another water immiscible solvent and agitating the mixture while adjusting the mixture to between about pH 8.5 and about pH 10.5, and recovering erythromycin from the solvent extract thus obtained.

4. A process for the recovery of erythromycin from dilute aqueous solutions thereof which comprises extracting said dilute aqueous solution with a water-immiscible solvent while maintaining a pH between about 9 and about 10.5, bringing said solvent extract thus obtained in countercurrent flow high speed extraction in contact with an aqueous acid solution buffered at pH 5 to about pH 6.5, mixing the aqueous extract thus obtained with another water-immiscible solvent having a relatively high temperature coefficient of solubility while concurrently adjusting said aqueous extract to a pH between about 8.5 and about 10.5, and crystallizing erythromycin from the solvent extract thus obtained.

5. A process for recovering erythromycin from whole fermentation beers which comprises heating the whole fermentation beer to a temperature between about 120 and 195 degrees Fahrenheit and cooling the heated beer to between about 100 degrees Fahrenheit and the ambient temperature, filtering the cooled beer, said heating, cooling, and filtering being effected at a pH of about 6.5 to 8, and recovering erythromycin therefrom.

6. A process for recovering erythromycin from whole fermentation beers which comprises heating the whole fermentation beer to a temperature between about 120 and 195 degrees Fahrenheit and cooling the heated beer to between about 100 degrees Fahrenheit and the ambient temperature, filtering the cooled beer, said heating, cooling, and filtering being effected at a pH of about 6.5 to 8, neutralizing the filtered beer to a pH between about 9.5 and about 10.5, extracting the neutralized beer with a water-immiscible solvent, extracting the solvent extract thus obtained with an aqueous acid solution maintained at a pH between about 5 and about 6.5, mixing the resulting aqueous extract with another water-immiscible solvent and concurrently adjusting the mixture to between about pH 8.5 and about pH 10.5, and recovering erythromycin from the solvent extract thus obtained.

7. A process for recovering erythromycin from whole fermentation beers which comprises heating the whole fermentation beer to a temperature between about 120 and 195 degrees Fahrenheit and cooling the heated beer to between about 100 degrees Fahrenheit and the ambient temperature, filtering the cooled beer, said heating, cooling, and filtering being effected at a pH of about 6.5 to 8, neutralizing the filtered beer to a pH between about 9.5 and about 10.5, extracting the neutralized and filtered beer with a water-immiscible solvent, bringing said solvent extract thus obtained in countercurrent flow high speed extraction in contact with an aqueous acid solution buffered at pH 5 to about pH 6.5, mixing the aqueous extract thus obtained with another water-immiscible solvent having a relatively high temperature coefficient of solubility while concurrently adjusting said aqueous extract to a pH between about 8.5 and about 10.5, and recovering erythromycin from the solvent extract thus obtained.

8. A process for the recovery of erythromycin from a solution of erythromycin free base in a water-immiscible solvent which comprises extracting said solution with an aqueous solution of a polybasic acid having one pKa between about 5 and about 6.5 separated from another pKa by not more than two pKa units, said solution being adjusted to a pH of between about 5 to about 6.5.

9. A process for the recovery of erythromycin from a solution of erythromycin free base in a water-immiscible solvent which comprises bringing said solution into contact with an aqueous solution of a weak acid, which has a pKa between about 5 and 6.5, and a strong base in the proportions to give a pH between about 5 and 6.5 in a countercurrent flow high speed extraction and in sufficient volume relative to the quantity of erythromycin to be extracted so that the pH of the aqueous solution does not materially change throughout the extraction.

10. A process for the recovery of erythromycin from a solution of erythromycin free base in a water-immiscible solvent which comprises bringing said solution into contact with an aqueous solution of a weak acid, the weak acid being a polybasic acid having one pKa between about 5 and about 6.5, separated from another pKa by not more than 2 pKa units, and a strong base in the proportions to give a pH between about 5 and about 6.5 in countercurrent flow high speed extraction.

11. A process for the recovery of erythromycin from a solution of erythromycin free base in a water-immiscible solvent which comprises bringing said solution into contact with an aqueous solution of a weak acid, said weak acid being a saturated, polycarboxylic acid having at least 4 carbon atoms, and a weak base in the proportions to give a pH between about 5 and about 6.5 in countercurrent flow high speed extraction.

12. A process for the recovery of erythromycin from a solution of erythromycin free base in a water-immiscible solvent which comprises bringing said solution into contact with an aqueous solution of a weak acid, said weak acid being citric acid, and a strong base in the proportions to give a pH between about 5 and about 6.5 in countercurrent flow high speed extraction.

References Cited in the file of this patent

UNITED STATES PATENTS

| | | |
|---|---|---|
| 2,653,899 | Bunch et al. | Sept. 29, 1953 |
| 2,670,132 | Podbielniak | Feb. 23, 1954 |

OTHER REFERENCES

Craig et al.: J. Biol. Chem., vol. 168, (1947), pages 665–686.

O'Keeffe et al.: J. Am. Chem. Soc., vol. 71 (1949), pages 2452–57.

Clark: Antibiotics and Chem., III, 663–371 (1953).

Sylvester et al.: 2nd Ann. Sym. on Antibiotics, October 1954, Paper No. 41.